Oct. 16, 1973 H. A. LORENZ ET AL Re. 27,783

BUILDING SYSTEMS

Original Filed March 10, 1969

INVENTORS
HOWARD A. LORENZ
ROBERT H. NAGY
INGVAR SCHOUSBOE

BY Morrill & Morrill

ATTORNEYS

United States Patent Office

Re. 27,783
Reissued Oct. 16, 1973

27,783
BUILDING SYSTEMS

Howard A. Lorenz, 2433 N. 111th St., Milwaukee, Wis. 53226; Robert H. Nagy, 1720 Arrowhead Court, Brookfield, Wis. 53005; and Ingvar Schousboe, 2104 S. Lynn St., Urbana, Ill. 61801

Original No. 3,535,841, dated Oct. 27, 1970, Ser. No. 805,458, Mar. 10, 1969. Application for reissue Jan. 14, 1972, Ser. No. 217,982
Int. Cl. E04b *1/04, 5/02;* E04h *1/04*
U.S. Cl. 52—236 12 Claims

Matter enclosed in heavy brackets [ ] appears in the original patent but forms no part of this reissue specification; matter printed in italics indicates the additions made by reissue.

ABSTRACT OF THE DISCLOSURE

The building system employs preformed upright erection elements, preferably of precast concrete, forming outer wall portions which extend from halfway below a floor to halfway between floors thereabove, presenting side edges against which the end portions of relatively long preformed structural walls of full height are swung and connected, whereby the usual need for temporary support for said structural walls, after they have been lowered into position by a crane, is eliminated. Other like erection elements for the next floor are supported endwise on the upper ends of the first erection elements and secured to upper portions of the structural walls to project halfway above the next floor.

BACKGROUND OF THE INVENTION

Field of the invention

The present invention is particularly suitable for use in the erection of buildings of the type which utilize precast concrete structural elements and walls.

Description of the prior art

Heretofore in the erection of buildings wherein large, massive precast concrete walls are used, it has been common practice to use a crane to lower each wall into position with its lower edge resting on a floor. There is then the problem of holding this wall in position until its ends can be connected to other structural elements of the building. Heretofore it has been common practice for many contractors to use metal braces for temporary supporting of such walls in upright position. This was a lengthy procedure as it took a long time to assemble the braces and attach them to the wall and floor in order to temporarily support the wall until it could be permanently connected to a permanent portion of the building. During all this time while the braces were being connected the crane had to remain connected to the wall to maintain it in upright position. Thus the crane was tied up for an unnecessary length of time when it could be employed for moving other elements into position. Inasmuch as the hourly cost of a crane and its operator is very substantial, this prior procedure has resulted in very high erection costs.

SUMMARY OF THE INVENTION

The present invention provides, in a building having multiple floors, upright concrete erection elements forming outer wall portions of the building which extend from halfway below a floor to a point halfway between floors. Thus when starting a new floor there are always rigidly connected upwardly projecting erection elements presenting side edges against which the end portions of full height precast structural walls may be braced and connected. This eliminates the need for temporary braces and frees the crane as soon as the wall has been swung into abutment with said side edges of the erection walls, erection elements for the next floor above being supported endwise on the upper ends of the first erection elements and being secured to upper portions of the adjacent structural wall.

It is a general object of the present invention to provide a building system which speeds the erection of buildings of the type using preformed concrete structural walls and elements.

A further object of the invention is to provide a building system which saves substantial expense by freeing the crane for further work as soon as a structural wall has been swung into proper position.

A further object of the invention is to provide a building system in which the erection walls and structural walls are very rigidly braced and supported to improve the overall rigidity of the building.

With the above and other objects in view, the invention consists of the improved building system, and all of its parts and combinations, as set forth in the claims, and all equivalents thereof.

BRIEF DESCRIPTION OF THE DRAWINGS

In the accompanying drawings, illustrating one complete embodiment of the preferred form of the invention, in which the same reference numerals designate the same parts in all of the views.

DESCRIPTION OF THE PREFERRED EMBODIMENTS

Figure 1:
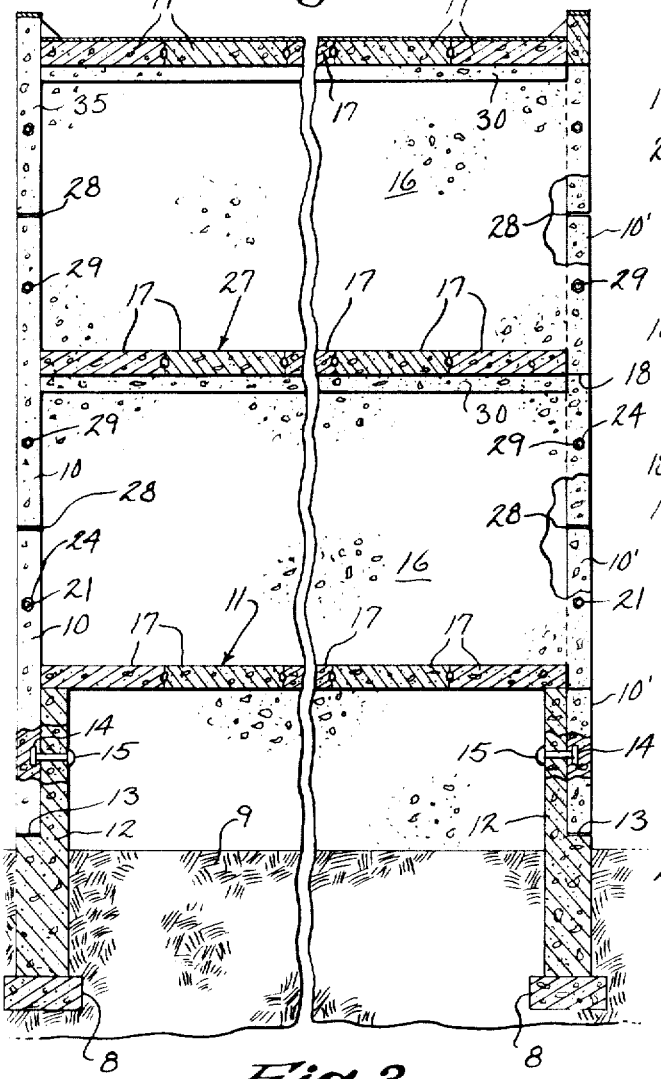
FIG. 1 is a vertical sectional view through a building, a central part of the structure being broken away.
Figure 3:
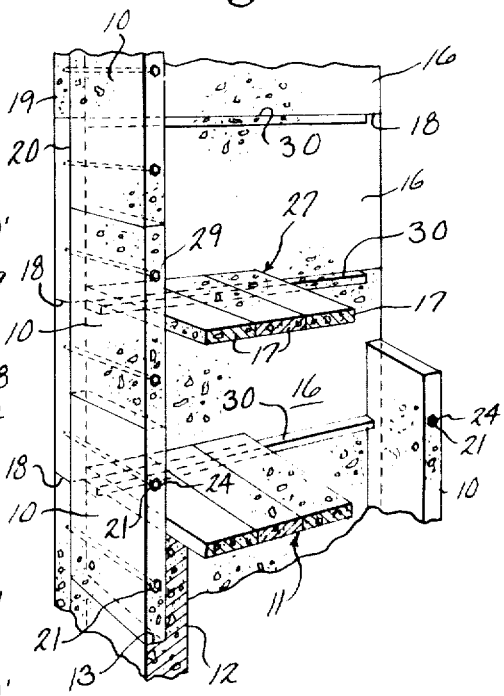
FIG. 3 is a fragmentary perspective view showing the improved erection method at an end of a building.

Referring more particularly to the drawing, the improved building system features preformed erection elements 10 which are one story in height, but are staggered with respect to the floor levels, their lower ends positioned well below a floor level and suitably anchored in position, and having their upper ends terminating intermediate floors, as is illustrated in FIGS. 1 and 3. While the erection elements 10 may be of any preformed material they are customarily preformed concrete members of elongated rectangular shape which have been precast and brought to the building site.

In FIG. 1 is illustrated conventional footings 8 in ground 9, the footings usually being of poured concrete and supportion foundation walls 12. The level of the ground 9 may vary depending upon the particular situation. The first set of erection elements 10 must be suitably anchored below the level of the first floor 11. Any suitable method may be employed for anchoring the lower portions of the lowermost erection walls. One suitable method is to have the foundation walls 12 formed with shoulders 13 on which the lower edges of the erection elements 10 may rest as shown in FIGS. 1 and 3. The erection elements may be cast with nuts 14 therein for threadingly receiving the ends of bolts 15. A suitable number of the bolts 15 may be employed to anchor the lowermost portion of the lowermost erection elements 10, which elements are to be used in supporting the first floor structural walls 16.

Figure 5:
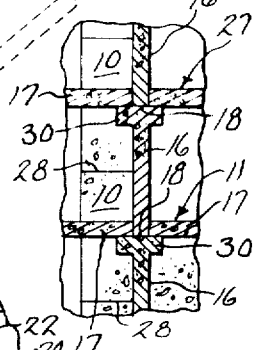
FIG. 5 is a fragmentary vertical sectional view through a portion of the building looking from the inside toward an outer wall.

The first floor 11 may be formed of any suitable material, but in the type of building under consideration it is usually composed of elongated preformed concrete planks 17, preferably prestressed. The planks may be supported on the upper edges of the foundation wall as shown in FIG. 3 where there are ledges 30 for the ends of the planks. In this type of building there will be a plurality of structural walls 16 which are to extend transversely of the building to divide the interior space and also form ends of the building as in FIG. 3. They also furnish support for the ends of the concrete planks 17 which will form the floors thereabove. These structural walls 16 are precast and trucked to the building site. Each structural wall 16 is then lifted by a crane and swung up above the level of the floor which it is to be used, and then lowered until the lower edge 18 of each structural wall is over a structural wall therebelow as in FIG. 5, the planks 17 being thereafter laid in place. These structural walls 16 are relatively long and heavy and considerable difficulty has heretofore been encountered in temporarily holding them before they are anchored in place.

Figure 4:
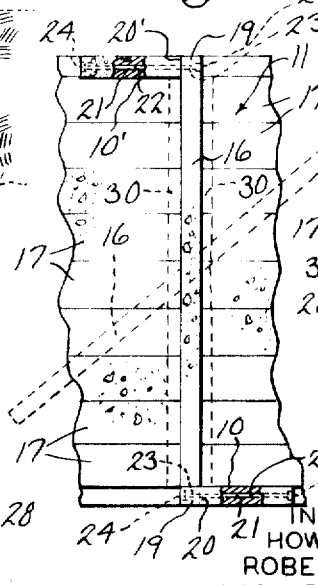
FIG. 4 is a fragmentary view looking down on the top of one of the floors showing an intermediate structural wall element connected in position to two erection elements, a central portion of the wall being broken away, and the dotted lines indicating a position of the structural wall before its ends have been swung into abutment with the erection elements.
Figure 2:
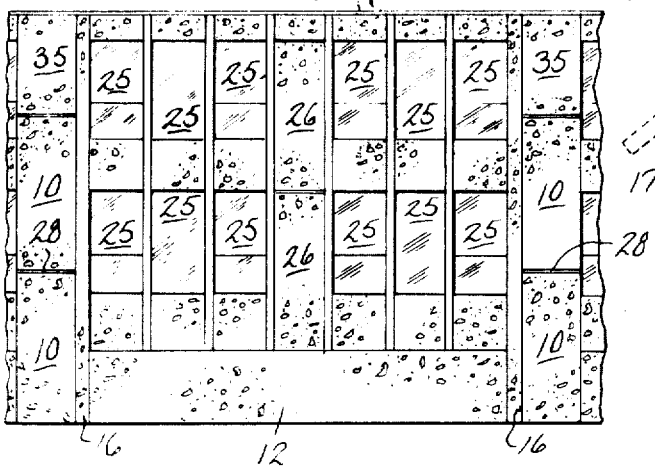
FIG. 2 is a fragmentary view on a smaller scale showing an outside elevation of one of the outside walls of a typical building.

With the present invention the erection elements 10, which are rigidly anchored below the floor, and which have upper portions projecting well above the level of the floor on which the structural walls are being laid, afford a novel means for supporting these structural walls. Preferably there will be erection elements 16 at the outside of the building located in a position to support a structural wall wherever such structural walls are used. FIG. 2 shows a typical spacing on the outside of the building between two tiers of erection elements 10. Preferably the erection elements 10 on one side of a building are staggered with respect to erection elements 10' on the opposite side, as shown in FIG. 4. This then permits a crane to lower a structural wall 16 into an oblique position as shown by dotted lines in FIG. 4, the wall 16 then being swung until its end portions 19 abut against the side edges 20 and 20' of the oppositely-disposed erection elements, When in the full line position of FIG. 4, a structural wall 16 will be immediately self-supporting and the crane may be promptly disconnected and swung away for further use. While FIG. 4 illustrates the two erection elements 10–10' to be staggered on opposite sides of the building, and while this is the preferred arrangement, the system can be carried out if the erection elements are directly opposite one another, and this arrangement is required at the ends of a building. In this particular situation it may be necessary to insert one or more tie bolts 21 before disconnecting the crane.

In either method one or more tie bolts 21 are inserted through preformed holes 22 in the erection elements and through holes 23 at the ends of the structural walls 16. Suitable nuts are threaded on the ends of the tie bolts. When all of the structural walls which are needed on a given floor have been secured in position, then the outside wall portions of the front and rear of the building may be filled in between tiers of erection elements 10 with suitable units filling the distance between floors. In FIG. 2 there is illustrated a number of window-containing units 25 and these may be spaced at intervals by precast wall elements 26 which are the same size and shape as the erection elements 10 but are the same size and shape as the erection elements 10 but which extend from one floor to another and which are not located to support structural walls. From FIG. 2 it is clear that the erection elements 10 are vertically staggered with respect to the conventional elements 25 and 26.

To prepare for the work on the second floor 27 a new set of erection elements 10 are installed as shown in FIGS. 1, 2 and 3. The lower ends of these erection elements are supported on the upper ends of the first set of erection elements, the joint line being at 28. This line 28 is staggered between floors. For convenience it is midway of the height between floors. Thus each erection element will extend from a line halfway below one floor to a line halfway above, as is clear from FIGS. 1 and 3. Conventional outside wall elements would all extend from one floor to another floor as do the elements 26 of FIG. 2, or would be multiples of a story in height. After the second set of erection elements 10 is installed and bolted to upper portions of the structural walls 16 by nuts and bolts 29, then another set of structural walls 16 is hoisted into position by cranes and they are swung into position for temporary support by erection elements in the manner shown in FIG. 4 and are then bolted to said erection elements. Thereafter more of the floor and ceiling planks 17 are laid to form the second floor 27. The ends of these planks 17 are supported on T-shaped upper end portions 30 of the structural walls. This procedure may be carried out from story to story until the building is completed. While FIG. 1 discloses a building with only two stories above the basement, the system may be applied to buildings of any desired height, FIG. 3 indicating a building where there are more than two floors. At the top of the building, as in FIG. 1, short elements 35 are used above the last erection elements 10 and 10' to fill the space at the upper half of the top floor.

What we claims is:

1. In a building structure including preformed massive structural elements, said building having a first floor, having a second floor spaced above said first floor, and having supporting means for said first floor located below the same, upright erection elements secured to the supporting means for the first floor below the floor level and projecting upwardly with upper ends terminating intermediate said first and second floor levels, a structural wall projecting upwardly from said first floor at right angles to said erection members and having an upper portion forming a support for said second floor, means securing ends of said structural wall to side edges of erection elements on opposite sides of the building, and other erection elements supported on the upper ends of said first erection elements and secured to said structural wall below said second floor level and having upper ends above said second floor level and terminating less than a full story distance above said second floor level for use in temporarily supporting and anchoring second floor structural walls.

2. A building structure as claimed in claim 1 in which each erection element is of full story height with its ends midway between floor levels.

3. A building structure as claimed in claim 1 in which tie bolts secure the walls to the erection elements.

4. A building structure as claimed in claim 1 in which at least one of the supporting walls has an erection element on one side of the building which abuts one of its sides and an erection element on the other side of the building which abuts its opposite side.

5. In a building erection system for multistory buildings, the steps of securing erection elements which form outside wall portions of the building in vertically staggered relation with respect to a floor level to provide rigid erection elements on opposite walls of the building which have upper ends terminating intermediate said first floor level and a next floor level, and installing structural walls by bringing each structural wall into upright position with respect to said first floor level by use of a crane and swinging it to a position where one end abuts a side edge of an erection element on one side of the building and where the other end abuts a side edge of an erection element on the opposite side of the building, securing said abutting portions to each other and installing erection elements for the next floor endwise on the upper ends of the first erection elements and securing them to upper portions of the adjacent structural wall.

6. A building erection system as set forth in claim 5 in which each erection element is one story in height.

7. A building erection system as set forth in claim 6 in which the erection elements are placed so that the upper end of each erection element is midway of the distance between floor levels.

8. A building erection system as set forth in claim 5 in which, for at least some of the structural walls, the erection element on one side of the building is secured in abutting relation against one side of the structural wall and the erection element on the other side of the building is secured in abutting relation to the other side of the structural wall.

*9. In a building structure including preformed massive structural elements, said building having one floor and having another floor spaced above said first-mentioned floor, upright erection elements supported below the level of said first-mentioned floor and projecting upwardly with upper ends terminating intermediate said first- and second-mentioned floor levels, a structural wall projecting upwardly from said first-mentioned floor at right angles to said erection members and having an upper portion forming a support for said second-mentioned floor, means securing a structural wall to the side edge of at least one erection element, and other erection elements supported on the upper ends of said first erection elements and secured to said structural wall below said second-mentioned floor level and having upper ends above said second-mentioned floor level and terminating less than a full story distance above said second-mentioned floor level for use in temporarily supporting and anchoring structural walls on said second-mentioned floor level.*

*10. A building structure as claimed in claim 9 in which each structural wall is secured to side edges of erection elements which are horizontally spaced from each other longitudinally of said structural wall.*

*11. In a building erection system for multi-story buildings, the steps of securing erection elements which form wall portions of the building in vertically-staggered relation with respect to a floor level to form horizontally-spaced erection elements which have upper ends terminating intermediate said first-mentioned floor level and a next floor level, and installing structural walls by bringing each structural wall into upright position with respect to said first-mentioned floor level by use of a crane and swinging it to a position where a portion of said structural wall abuts a side edge of at least one erection element, securing said abutting portions to each other, and installing erection elements for the next floor endwise on the upper ends of the first erection elements and securing them to upper portions of the adjacent structural wall.*

*12. A building erection system as claimed in claim 11 in which each structural wall is swung into abutment with the side edges of erection elements which are horizontally spaced from one another longitudinally of the structural wall.*

References Cited

The following reference, cited by the Examiner, are of record in the patented file of this patent or the original patent.

UNITED STATES PATENTS

| | | | |
|---|---|---|---|
| 1,045,522 | 11/1912 | Conzelman | 52—236 |
| 2,057,444 | 10/1936 | O'Reilly | 52—234 |
| 2,497,887 | 2/1950 | Hilpert. | |

JOHN E. MURTAGH, Primary Examiner

U.S. Cl. X.R.

52—266, 285. 741